United States Patent
Gentry, Jr. et al.

(10) Patent No.: US 12,309,114 B2
(45) Date of Patent: May 20, 2025

(54) MANAGEMENT OF COMMUNICATIONS FOR OVERLAPPING SUBNETS USING IPV6 ADDRESSING

(71) Applicant: Tailscale Inc., Toronto (CA)

(72) Inventors: Denton E. Gentry, Jr., San Carlos, CA (US); Bradley J. Fitzpatrick, Seattle, WA (US); Maya Kaczorowski, San Francisco, CA (US); David Crawshaw, Berkeley, CA (US)

(73) Assignee: Tailscale Inc., Toronto (CA)

( * ) Notice: Subject to any disclaimer, the term of this patent is extended or adjusted under 35 U.S.C. 154(b) by 0 days.

(21) Appl. No.: 18/099,304

(22) Filed: Jan. 20, 2023

(65) Prior Publication Data

US 2024/0031326 A1 Jan. 25, 2024

Related U.S. Application Data

(60) Provisional application No. 63/391,229, filed on Jul. 21, 2022.

(51) Int. Cl.
*H04L 61/251* (2022.01)
*H04L 101/668* (2022.01)

(52) U.S. Cl.
CPC ...... *H04L 61/251* (2013.01); *H04L 2101/668* (2022.05); *H04L 2212/00* (2013.01)

(58) Field of Classification Search
None
See application file for complete search history.

(56) References Cited

U.S. PATENT DOCUMENTS

| | | | | |
|---|---|---|---|---|
| 10,819,617 | B1 * | 10/2020 | Ghule | H04L 45/20 |
| 2004/0107287 | A1 * | 6/2004 | Ananda | H04L 61/25 |
| | | | | 709/230 |
| 2005/0152298 | A1 * | 7/2005 | Thubert | H04L 61/251 |
| | | | | 370/312 |
| 2006/0168267 | A1 * | 7/2006 | Fernandes | H04L 69/167 |
| | | | | 709/230 |
| 2007/0147421 | A1 * | 6/2007 | Kim | H04L 61/2535 |
| | | | | 370/395.54 |
| 2009/0157900 | A1 * | 6/2009 | Ge | H04L 69/167 |
| | | | | 709/236 |
| 2013/0097336 | A1 * | 4/2013 | Lu | H04L 61/251 |
| | | | | 709/245 |
| 2013/0223445 | A1 * | 8/2013 | Palani | H04L 61/251 |
| | | | | 370/392 |

(Continued)

FOREIGN PATENT DOCUMENTS

| KR | 100849494 B1 * | 12/2006 | ......... H04L 61/2592 |
|---|---|---|---|
| WO | WO-2004049668 A1 * | 6/2004 | ......... H04L 12/4633 |
| WO | WO-2021052381 A1 * | 3/2021 | ............ H04L 12/18 |

*Primary Examiner* — Phyllis A Book

(57) ABSTRACT

Described herein are systems, methods, and software to manage communications for a network with overlapping IPv4 addressing subnets. In one example, a method of operating a gateway includes receiving a first packet that encapsulates a second packet, the second packet comprising an IPv6 destination address. The method further includes decapsulating the first packet to obtain the second packet, translating the IPv6 destination address to an IPv4 destination address, and communicating the second packet with the IPv4 destination address in place of the IPv6 destination address to a destination computing element.

18 Claims, 7 Drawing Sheets

(56) References Cited

U.S. PATENT DOCUMENTS

| | | | |
|---|---|---|---|
| 2015/0281069 A1* | 10/2015 | Brzozowski | H04L 61/251 |
| | | | 370/392 |
| 2018/0375684 A1* | 12/2018 | Filsfils | H04L 45/507 |
| 2022/0021645 A1* | 1/2022 | Boutros | H04L 12/66 |

* cited by examiner

MANAGEMENT OF COMMUNICATIONS FOR OVERLAPPING SUBNETS USING IPV6 ADDRESSING

RELATED APPLICATIONS

This application hereby claims the benefit of and priority to U.S. Provisional Patent Application No. 63/391,229, titled "MANAGEMENT OF COMMUNICATIONS FOR OVERLAPPING SUBNETS USING IPV6 ADDRESSING," filed Jul. 21, 2022, and which is hereby incorporated by reference in its entirety.

TECHNICAL BACKGROUND

In computing networks, physical and virtual computing systems can include applications and services that require communications with other computing systems to provide desired operations. For example, an application on a first computing system may require data from a storage server located on a second computing system. To provide the communication, the data payload may be placed in a network packet and transferred to the required computing system. However, although network packets provide a method of communication between computing systems, difficulties often arise in maintaining security and configuration information to support the communications.

To overcome some of the deficiencies presented in securing network communications, various technologies have been developed. These technologies include virtual local area networks (VLANs), encryption for the data payload within the data packets, amongst other similar security procedures. Yet, while these security technologies may provide additional security over unprotected network packets, configuring private networks can be difficult and cumbersome. These difficulties are compounded as the number of virtual and physical computing elements are increased in a network, requiring increased management in association with addressing for the computing elements.

SUMMARY

The technology described herein manages overlapping subnets using IPv6 to IPv4 translation. In one implementation, a gateway is configured to receive a first packet that encapsulates a second packet, the second packet comprising an IPv6 destination address. The gateway is further configured to decapsulate the first packet to obtain the second packet and process the IPv6 destination address to determine whether address translation is required in association with the second packet. When address translation is required, the gateway translates the IPv6 destination address to an IPv4 destination address and communicates the second packet with the IPv4 destination address in place of the IPv6 address to a destination computing element. In some implementations, in replacing the IPv6 address with the IPv4 address, the gateway can replace the IPv6 header with an IPv4 header that includes at least the IPv4 destination address as the destination for the packet.

In some implementations, the IPv6 address comprises a unique identifier that identifies the gateway in relation to one or more other gateways. In some examples, the IPv6 address can further contain the IPv4 destination address, wherein the IPv4 destination corresponds to a subnet supported by the gateway.

DETAILED DESCRIPTION

Figure 1:
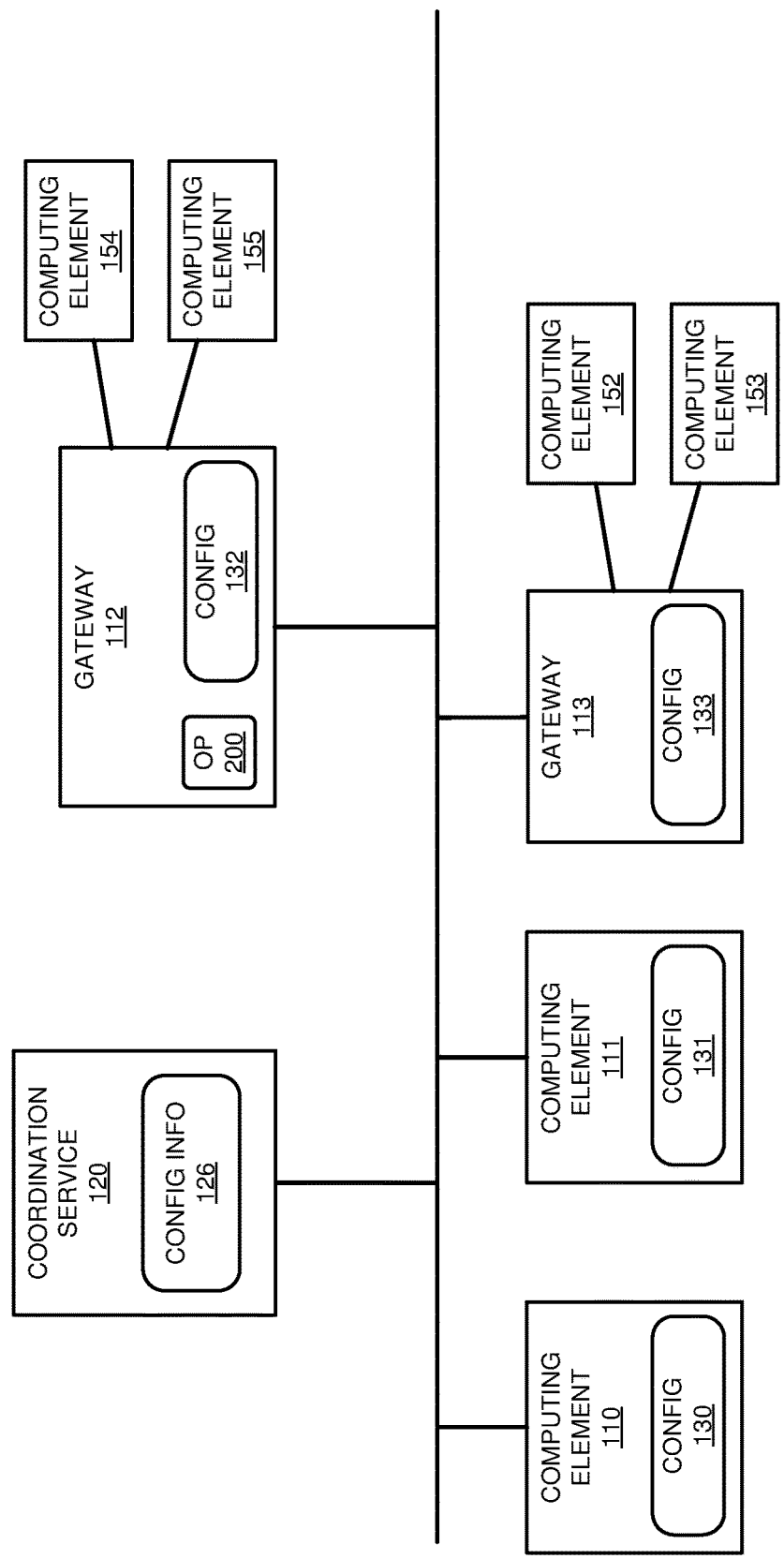
FIG. 1 illustrates a computing environment to manage overlapping subnets in a private network using IPv6 to IPv4 translation according to an implementation.

FIG. 1 illustrates a computing environment 100 to manage overlapping subnets in a private network using IPv6 to IPv4 translation according to an implementation. Computing environment 100 includes coordination service 120, computing elements 110-112 and 152-155, and gateways 112-113. Coordination service 120 may use one or more computers to support the management and distribution configuration information 126. Coordination service 120 can be implemented as a virtual machine on a computer in some examples. Computing elements 110-111 and gateways 112-113 include configurations 130-133. Gateway 112 is further configured to perform operation 200 that is described below in FIG. 2. Gateways 111-112 can be representative of routers capable of connecting computing elements 152-155 with other computing elements via the internet.

In computing environment 100, coordination service 120 supports a private network using configuration information 126. When a computing element requests to join the private network, the computing element can communicate a request with credentials to coordination service 120, wherein the credentials can include identifier information associated with the requesting computing element. In response to the request, coordination service 120 may verify the requesting computing element and provide communication configuration to the computing element, permitting the computing element to communicate with one or more other members of the private network. For example, computing element 110 can represent a computer that attempts to join a private corporate network. In response to the request from computing element 110, coordination service 120 can determine whether computing element 110 is permitted to join the network and provide configuration 130 to computing element 110 when computing element is permitted to join the network. Configuration 130 can include encryption keys to communicate with other computing elements (and gateways), public IP addressing information, private IP addressing information, or some other information to support the communications in the network. In some examples, the information that is provided is based on the identity of the computing element and/or user of the computing element that is supplied as part of the credentials.

When a communication is requested by computing element 110 to computing element 111, the communication can use a private destination IP address associated with computing element 111 and private source IP address associated with computing element 110. The destination IP address can be obtained using a DNS request, wherein a domain can be translated to the requisite destination IP address using configuration 130. Once the communication with the private IP addresses is generated, the communication is encapsulated using an encryption key associated with computing element 111 and communicated over the network using the public IP addressing information associated with computing elements 110-111.

In some implementations, computing elements, such as computing elements 152-155, can use a gateway to support the communications over the private network. Rather than decapsulating or encapsulating packets at the individual computing element, the gateway can support the encapsulation and decapsulation of packets. For example, when an encapsulated packet is received at gateway 112, gateway 112 can decapsulate the packet and forward the packet to a destination computing element of computing elements 154-155. Computing elements 154-155 can receive the packet without identifying the existence of the private network.

In the examples of gateways 112-113, gateways 112-113 may communicate with coordination service 120 to indicate subnets that are available behind the gateway. For example, gateway 112 can support virtual machines, containers, and physical devices that use an IPv4 subnet. Gateway 113 can also indicate an IPv4 subnet that is available behind the gateway. When the subnets overlap, coordination service 120 can assign a unique identifier to each of gateways 112-113 that directs packets to the correct gateway. Specifically, rather than using the IPv4 address associated with a computing element, the packets can use an IPv6 address that indicates the IPv4 address for the computing element and the unique identifier for gateway 112. Accordingly, if computing element 110 generated a packet for delivery to computing element 154, the packet can use the IPv6 address associated with computing element 154. The packet is then encapsulated at computing element 110 and communicated to a public IP address for gateway 112. The encapsulation and use of the public IP address for gateway 112 can be defined in configuration 130. Once the packet is received at gateway 112, the packet is decapsulated, the IPv6 address is translated to an IPv4 address, and the packet is forwarded to computing element 154. Advantageously, while multiple gateways (which can each represent virtual private clouds) can support computing elements that use the same subnet, IPv6 addressing can be used to define the appropriate destination gateway for a packet. In some examples, in translating the IPv6 address to the IPv4 address, gateway 112 can convert the IPv6 header for the packet to an IPv4 header. The IPv4 header can comprise at least the destination IPv4 address and can further include a source IPv4 address in some examples.

In some implementations, the sending computing element 110 can manually enter the IPv6 address, however, sending computing element may use a domain name system (DNS) associated with the private network to translate a domain into the IPv6 address. The DNS can be local to computing element 110 and provided by coordination service 120 or can be located on another system available to computing element 110. When a packet is generated, the packet is identified by a service on computing element 110, wherein the service can identify the IPv6 address and encapsulate the packet based on the IPv6 address. The encapsulation may include encrypting using a key associated with gateway 112, adding public addressing information for gateway 112 and computing element 110, or some other operation. Once encapsulated, the encapsulated packet can be forwarded to gateway 112.

Figure 2:
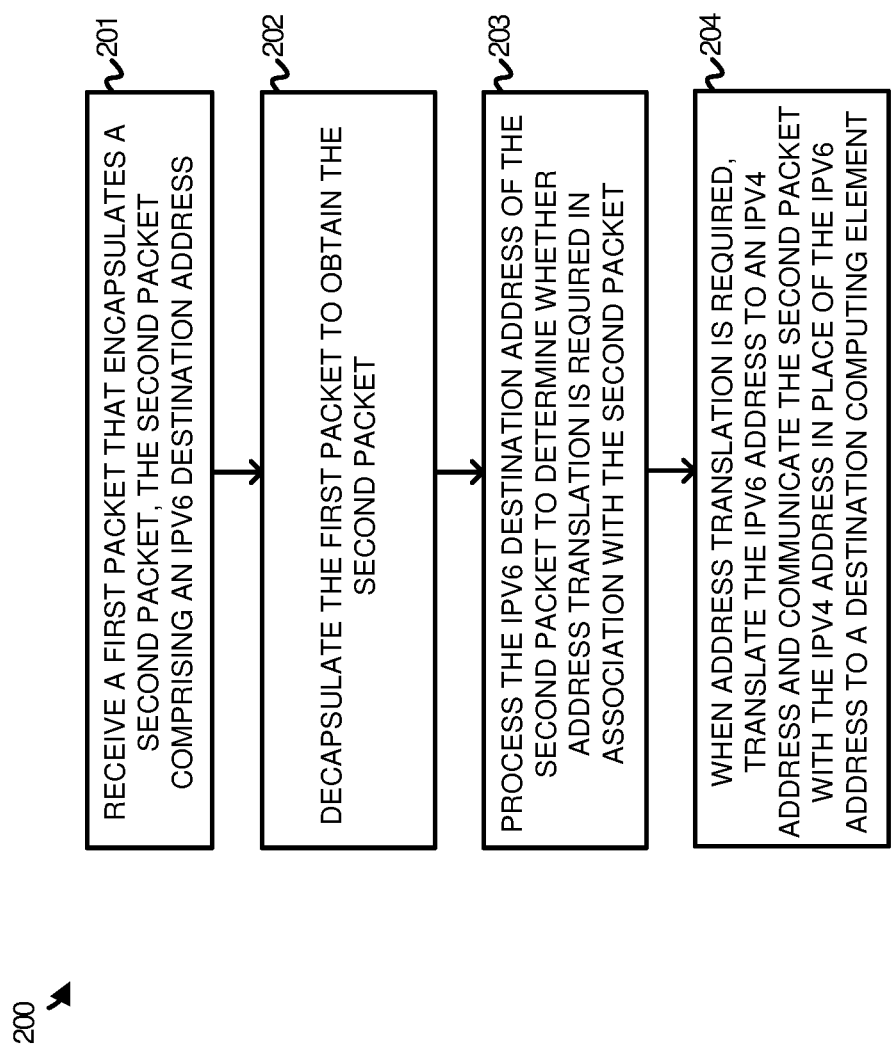
FIG. 2 illustrates an operation of a gateway to manage overlapping subnets in a private network using IPv6 to IPv4 translation according to an implementation.

FIG. 2 illustrates an operation 200 of a gateway to manage overlapping subnets in a private network using IPv6 to IPv4 translation according to an implementation. The steps of operation 200 are referenced parenthetically in the paragraphs that follow with reference to systems and elements of computing environment 100. Although demonstrated using gateway 112, similar operations can be performed by gateway 113 to support communications with computing elements 152-153.

In operation 200, gateway 112 receives (201) a first packet that encapsulates a second packet, the second packet comprising an IPv6 address. In some implementations, computing elements in a private network are assigned private IP addresses to support communications between the devices. For virtual private clouds (VPCs), computing elements behind the private cloud can be associated with a subnet. For example, computing elements 154-155 can correspond to a first subnet and computing elements 152-153 can correspond to a second subnet, wherein at least a portion of computing elements 152-155 can share the same IPv4 address. To prevent communications being directed at the wrong computing node, gateways 112-113 can each be assigned a unique identifier by coordination service 120. The unique identifier can be included as part of an IPv6 address that also includes the IPv4. Thus, the VPC can be uniquely identified along with the IPv4 subnet address for the destination computing element. For example, a packet communicated by computing element 110 directed at computing element 154 can use the IPv6 address associated with computing element 154 as the destination IP address. Once the packet is generated, computing element 110 can encapsulate the packet based on configuration 130, wherein the encapsulation can encrypt the packet using a key associated with gateway 112 and a destination public IP address associated with gateway 112 in the encapsulation header. The encapsulated packet is then forwarded to gateway 112.

In response to receiving the first packet, operation 200 further decapsulates (202) the first packet to obtain the second packet and processes (203) the IPv6 destination address of the second packet to determine whether address translation is required in association with the second packet. Here, the decapsulation may use a private encryption key associated with gateway 112. Once decapsulated, gateway 112 can determine whether the destination IPv6 address includes a flag or other identifier indicating the translation requirement. In other implementations, gateway 112 can be configured to translate all incoming packets from an IPv6 to an IPv4 address.

When address translation is required, operation 200 further translates (204) the IPv6 address to an IPv4 address and communicates the second packet with the IPv4 address in place of the IPv6 address to a destination computing element. In some examples, gateway 112 can extract the IPv4 address from the IPv6 address and forward the packet to the computing element associated with the IPv4 address. Returning to the example of computing element 110 generating a packet destined for computing element 154, gateway 112 can replace the destination IPv6 address with the corresponding IPv4 address, wherein the address may be included in the IPv6 address. Once translated, the packet is forwarded to computing element 154. Computing element 110 can distinguish between forwarding the packet to gateway 112 or gateway 113 based on the IPv6 address that includes the unique identifier for either gateway 112 or gateway 113. In some examples, in replacing the IPv6 address with the IPv4 address, gateway 112 can generate a replacement IPv4 header for the packet. The IPv4 header can include at least the destination IPv4 address and can further include a source IPv4 address or some other IPv4 information.

Figure 3:
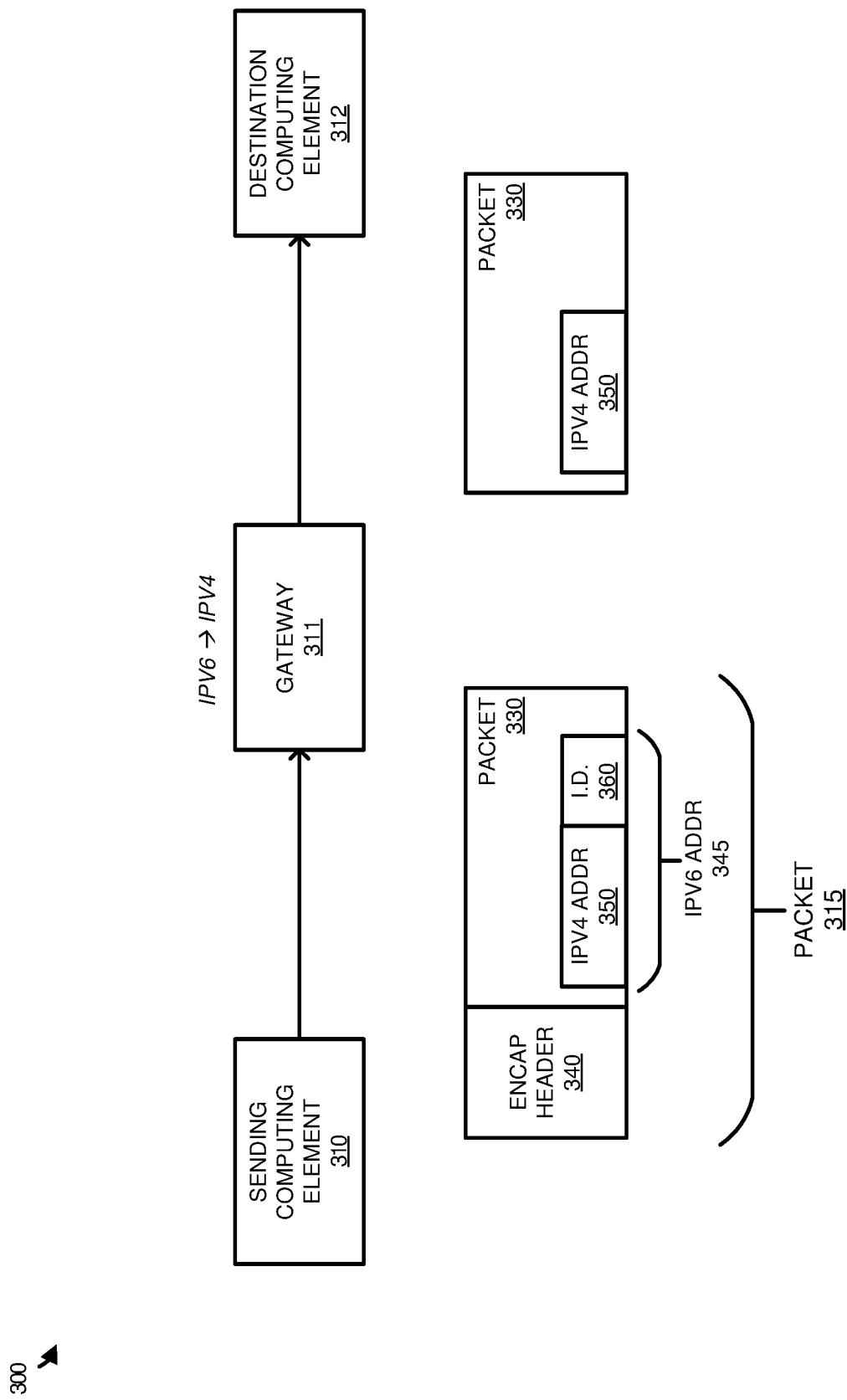
FIG. 3 illustrates an overview of packet flow for a gateway to provide IPv6 to IPv4 translation according to an implementation.

FIG. 3 illustrates an overview 300 of packet flow for a gateway to provide IPv6 to IPv4 translation according to an implementation. Overview 300 includes sending computing element 310, gateway 311, and destination computing element 312. Operational scenario 300 further includes packet 315 with encapsulation header 340 and packet 330. Packet 330 includes IPv6 address 345 with IPv4 address 350 and identifier 360.

In overview 500, sending computing element 310 communicates packet 315 to gateway 311. In generating packet 315, an application on sending computing element 310 can identify a destination IPv6 address associated with the destination computing element. The IPv6 address can be manually entered, can be determined via a domain name system (DNS), or can be identified in some other means. In at least one example, sending computing element 310 can receive a DNS configuration that permits DNS requests to be supplied with addresses associated with other computing elements in the private network. For example, a DNS request by an application on sending computing element 310 can return IPv6 address 345, permitting packet 330 to be generated for the application. Once packet 330 is generated, the packet can be forwarded to a private networking service that can operate as part of the operating system for sending computing element 310 or can act as a standalone process. The private networking service can identify IPv6 address 345 and encapsulate packet 330 as packet 315. The encapsulation can use an encryption key associated with gateway 311, can include public addressing information associated with sending computing element 310 and gateway 311, or can include some other information. The public addressing information can include public IP addressing, public ports, or some other public addressing information. In some examples, the private networking service can determine the public addressing information and encryption information for the packet based on a configuration supplied by the coordination service. The configuration information can associate the IPv6 address 345 with public addressing information and encryption information associated with the IPv6 address. In some examples, the configuration information can associate a unique identifier 360 for gateway 311 included in the IPv6 address to select encryption and public addressing for packet 315. Specifically, the private networking service can identify packet 330, identifies unique identifier 360 in packet 330, and select parameters for encapsulation based on the identifier. Advantageously, rather than maintaining a unique entry for each computing element behind gateway 311, an address with the unique identifier for gateway 311 may be encapsulated and forwarded to gateway 311 using encryption and public addressing associated with the gateway. Thus, multiple computing elements in an IP subnet at a gateway can be encapsulated in a similar manner. Further, while demonstrated with a single gateway, other unique identifiers can be associated with other gateways in the private network. Thus, while multiple gateways can support the same private addressing subnet, outside computing elements, such as developer or administrator computing elements, can communicate using a unique IPv6 address associated with the element of interest.

After packet 315 is generated, the packet is communicated to gateway 311. Gateway 311 may represent a router for a virtual private cloud that supports network connectivity for virtual machines, containers, and the like in the private network cloud. In response to receiving packet 315, gateway 311 decapsulates the packet, wherein the decapsulation may use a private encryption key for gateway 311. Once decapsulated, gateway 311 can determine whether address translation is required in association with IPv6 address 345. In some examples, IPv6 address 345 includes a flag indicating the requirement of translation. Once identified, gateway 311 can identify IPv4 address 350 in IPv6 address 345 and replace IPv6 address 345 with IPv4 address 350 in packet 350. Once replaced, the packet can be forwarded to the destination computing element (e.g., a virtual machine). The replacement of the IPv6 address with the IPv4 address can include replacing the IPv6 header of the packet with an IPv4 header that comprises at least the IPv4 destination address.

Figure 4:
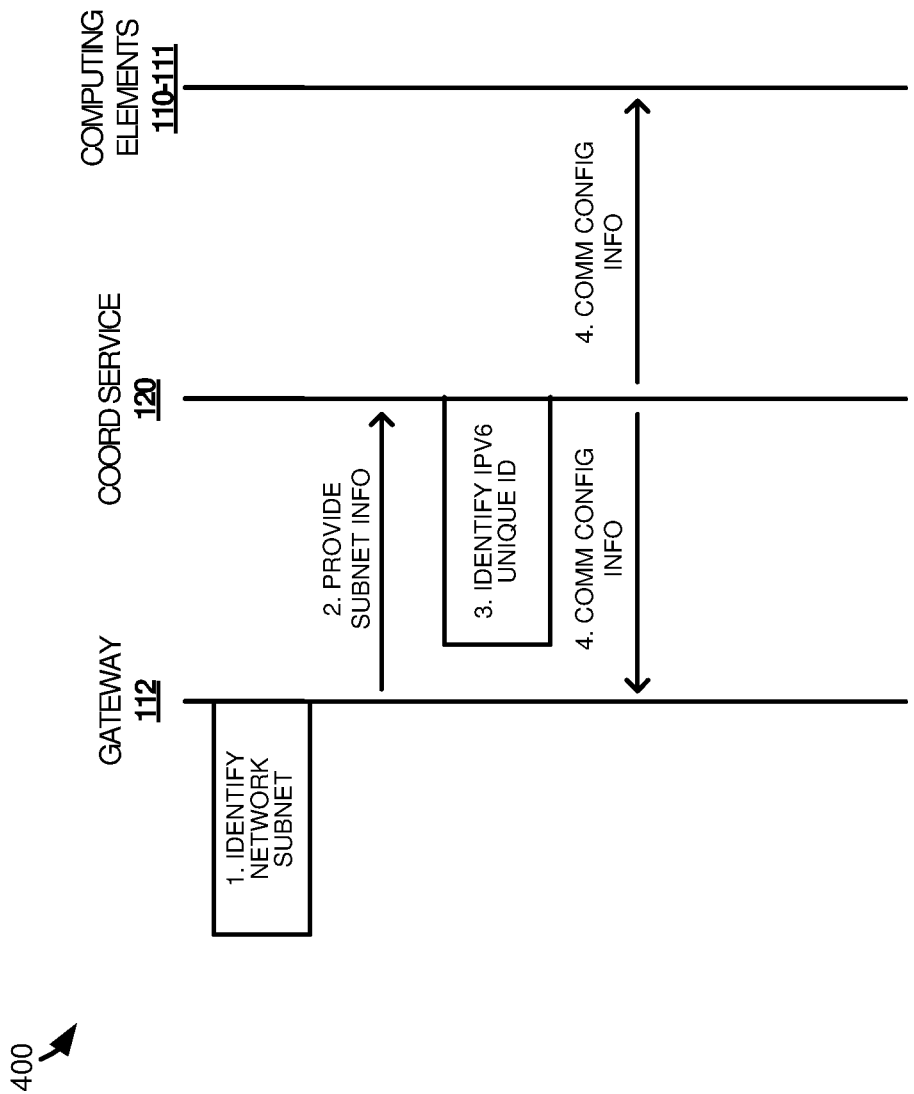
FIG. 4 illustrates a timing diagram of requesting and distributing configuration information for a private network according to an implementation.

FIG. 4 illustrates a timing diagram 400 of requesting and distributing configuration information for a private network according to an implementation. Timing diagram 400 includes gateways 112, coordination service 120, and computing elements 110-111 from computing environment 100 of FIG. 1.

In timing diagram 400, gateway 112 identifies a network subnet in association with computing elements connected to gateway 112 at step 1. The computing elements may comprise virtual machines, containers, physical computers, or some other computing element. In some implementations, gateway 112 can represent a router for a VPC, wherein gateway 112 connects a subnet of private addresses to a larger network. Gateway 112 then provides the subnet information to coordination service 120 at step 2, wherein the coordination service is responsible for distributing communication configuration information to computing elements of a private network.

Once provided, coordination service 120 can identify an IPv6 unique identifier for the gateway at step 3 and distribute communication configuration information in the network to computing elements and gateways in the private network to support communication at step 4. The configuration information can include public encryption keys, public addressing information, private addressing information, or some other information. The private addressing information can include IP addresses allocated the subnet for gateway 120, IP addresses allocated for other computing elements in the network, available types of communications (protocols, ports, and the like), or some other information. For example, coordination service 120 can provide a unique identifier for packets communicated to gateway 112 to computing elements 110-111, wherein computing elements 110-111 can combine the unique identifier for gateway 112 with an IPv4 address for a computing element behind gateway 112 to generate an IPv6 address for the computing element. The IPv6 address can further include an indicator that requires a translation to IPv4 address or some other information to deliver a packet to a computing element behind gateway 112. Further, the information provided to gateway 112 may include private and public addressing information to communicate with computing elements 110-111 or some other information.

Once communication configuration information is distributed to computing elements 110-111 and gateway 112, an application at computing element 110 can generate a packet that addresses a computing element behind gateway 112. The packet can use an IPv6 address allocated by coordination service 120, wherein the IPv6 address includes the IPv4 address for the subnet behind gateway 112, a unique identifier for gateway 112, an indication that the packet comprises a private network packet, or some other information. After generating the packet, computing element 112 can identify that the packet is a private network packet, encapsulate the packet using an encryption key and public addressing information associated with gateway 112. Once encapsulated, the packet can be communicated to gateway 112. In response to receiving the packet, gateway 112 can decapsulate the packet, translate the IPv6 address to the IPv4 address, and forward the packet to the destination computing element (e.g., virtual machine). In translating the address, gateway 112 can replace the IPv6 header with an IPv4 header that includes at least the destination IPv4 address to direct the packet to the destination computing element.

Figure 5:
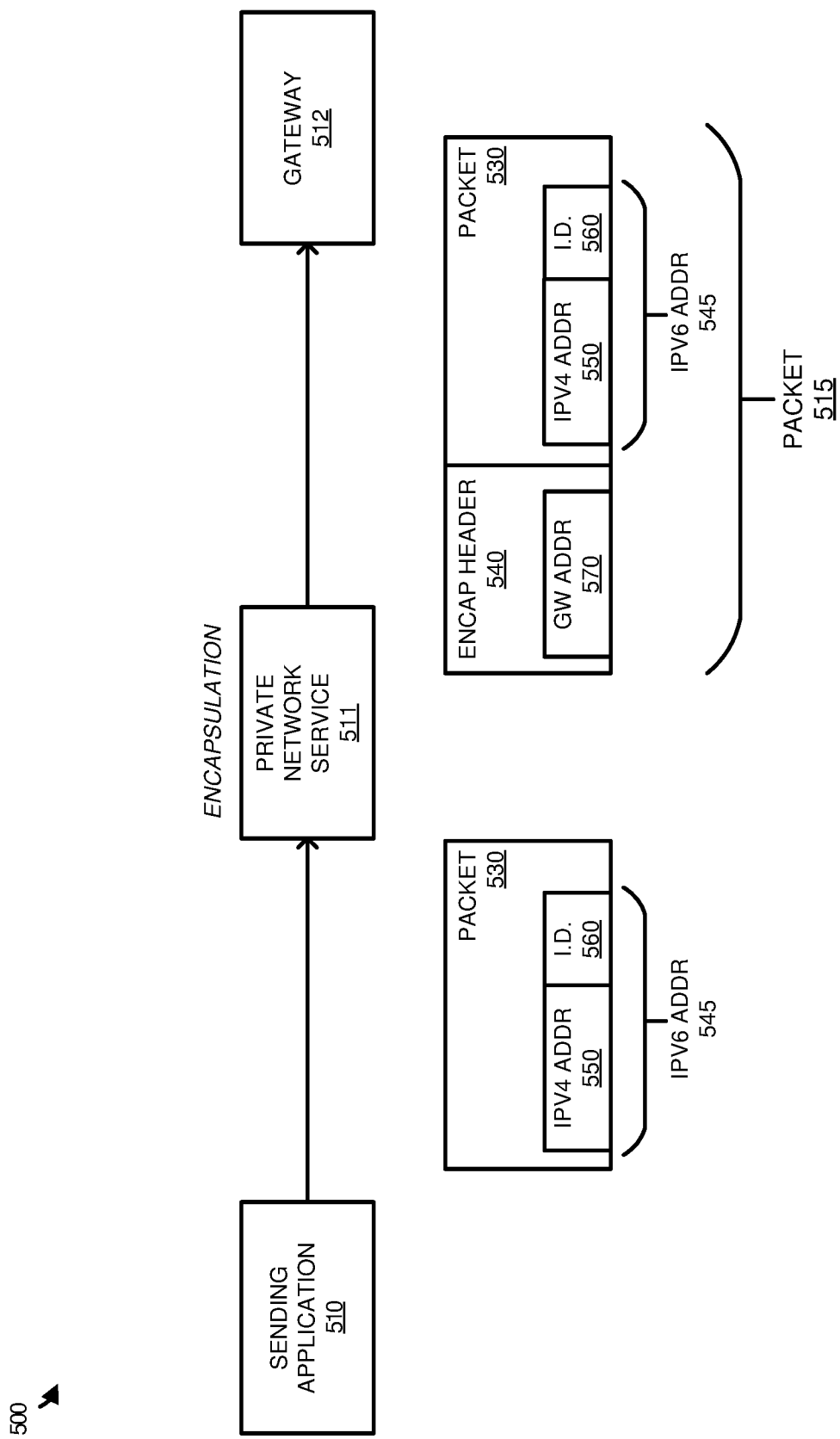
FIG. 5 illustrates an overview of packet generation in a private network according to an implementation.

FIG. 5 illustrates an overview 500 of packet generation in a private network according to an implementation. Overview 500 includes sending application 510, private network service 511, and gateway 512. Overview 500 further includes packet 515, packet 530, encapsulation header 540, gateway addressing 570, IPv4 addressing 550, and identifier 560 representative of a gateway identifier for gateway 512. Sending application 510 and private network service 511 can operate on the same computing system in some examples, wherein private network service 511 can represent the operating system or a separate service capable of providing the encapsulation operations described herein.

In overview 500, sending application 510 generates packet 530 with IPv6 addressing 545, wherein IPv6 addressing 545 includes IPv4 addressing 550 and identifier 560. In some implementations, the IPv6 address can be manually entered for sending application 510, wherein a user may identify the IPv6 address and enter the address as the destination for the packet. In other implementations, sending application 510 can generate a DNS request to a DNS associated with the private network. For example, sending application 510 may generate a DNS request with the domain associated with IPv6 address 545. The request can be forwarded to a DNS on the same computing system as sending application 510 or can be forwarded to an external DNS. The DNS can then return IPv6 address 545 that corresponds to the unique address for the destination computing element for the packet.

Once packet 530 is generated, packet 530 is identified by private network service 511. Private network service 511 can correspond to the operating system or another service executing on the computing system with sending application. Private network service 511 can execute on a separate system (e.g., router) in some examples. In response to identifying packet 530, private network service 511 performs encapsulation on packet 530 based at least on the IPv6 address 545. In some examples, private network service 511 may process the addressing attributes in packet 530 to determine whether the communication is permitted. Specifically, the addressing information can be compared to the permitted communications provided from the coordination service. Once the communication is permitted, the packet is encapsulated, wherein packet 530 is encrypted using a public encryption key associated with gateway 512 and encapsulation header 540 is added for the encapsulation header. Encapsulation header 540 includes public addressing information, including gateway address 570 that corresponds to gateway 512. Other information in encapsulation header 540 can include public source IP addressing, public source and destination port information, protocol information, or some other information.

In some examples, in identifying the destination gateway 512 for the packet, IPv6 address 545 can indicate a unique identifier for gateway 512. The unique identifier can be used to distinguish gateway 512 from other gateways with possible overlapping subnets. For example, gateway 512 may act as a router for a plurality of computing elements (e.g., virtual machines) that correspond to a first subnet, and a second gateway that acts as a router for a second plurality of computing elements that correspond to a second subnet, wherein the first subnet overlaps at least partially with the second subnet. To permit direct communications to the first subnet and the second subnet, the coordination service can assign or indicate a unique identifier for the gateway associated with the computing element. When the packet is generated, the IPv6 address can include a notification that translation is required from the IPv6 address to the IPv4 address when the packet is received at the destination gateway 512. IPv6 address 545 further includes an identifier for gateway 512 and IPv4 address 550 that corresponds to IPv4 address of the destination computing element in the subnet. Accordingly, while sending application 510 can use an IPv6 address to communicate the packet to appropriate destination gateway and subnet, translation can be performed on the address at the gateway to provide the expected IPv4 address in the header of packet 530.

After packet 515 is generated, the packet is forwarded to gateway 512, wherein gateway 512 can represent a router for a subnet of end computing elements. Gateway 512 can decapsulate the packet by applying the private encryption key associated with gateway 512 and can process the packet to determine whether address translation is required in association with packet 530. In some implementations, IPv6 address 545 may include a notification or flag that network address translation is required. Once the flag is identified by gateway 512, IPv4 address 550 can be extracted from the IPv6 address 545 and used to replace IPv6 address 545 prior to forwarding to a destination computing element. In replacing the IPv6 destination address with the IPv4 destination address, the IPv6 header can be replaced with an IPv4 header that includes at least the destination IPv4 address to direct communications to the destination computing element.

In some implementations, by using unique gateway identifiers, such as identifier 560 for gateway 512, packet processing operations can be expedited for gateway 512. Specifically, gateway 512 identifies a flag (comprising a set of one or more bits in the IPv6 header), identifies the IPv4 address in the IPv6 address, and applies the IPv4 address in place of the IPv6 address. Accordingly, rather than translating the IPv6 address using a data structure or table, the IPv4 address can be extracted from the included IPv6 address. Additionally, the sending computing element (e.g., administrator computer) can identify the gateway identifier in the IPv6 address and identify the required public addressing information based on the gateway identifier. The public addressing information can include a public IP address associated with the gateway, a source IP address associated with the sending computing element, or some other communication information.

Figure 6:
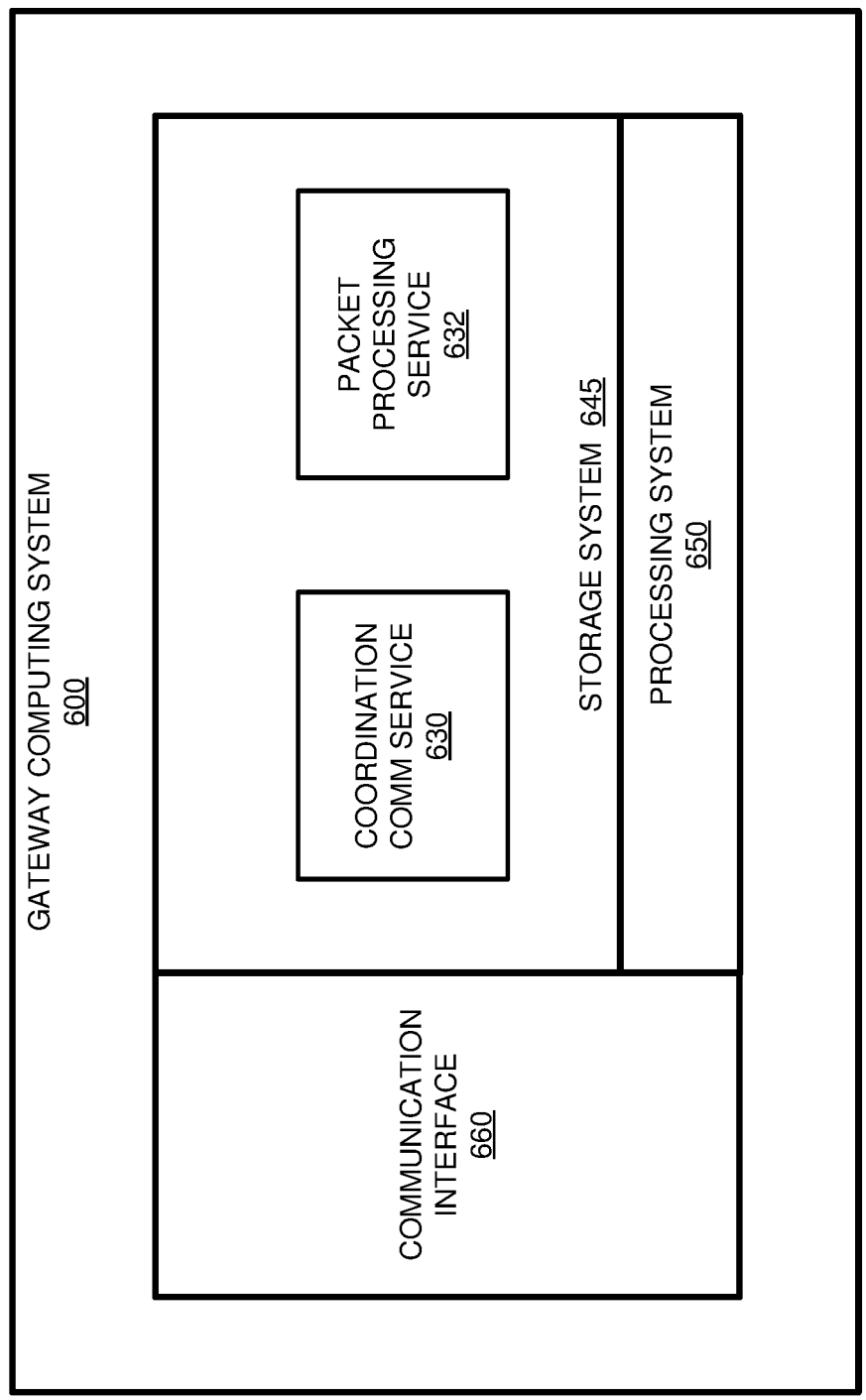
FIG. 6 illustrates a gateway computing system to manage overlapping subnets in a private network using IPv6 to IPv4 translation according to an implementation.

FIG. 6 illustrates a gateway computing system 600 to manage overlapping subnets in a private network using IPv6 to IPv4 translation according to an implementation. Computing system 600 is representative of any computing system or systems with which the various operational architectures, processes, scenarios, and sequences disclosed herein for a computing element can be implemented. Computing system 600 is an example of gateways 112-113 of FIG. 1, although other examples may exist. Computing system 600 includes storage system 645, processing system 650, and communication interface 660. Processing system 650 is operatively linked to communication interface 660 and storage system 645. Communication interface 660 may be communicatively linked to storage system 645 in some implementations. Computing system 600 may further include other components such as a battery and enclosure that are not shown for clarity.

Communication interface 660 comprises components that communicate over communication links, such as network cards, ports, radio frequency (RF), processing circuitry and software, or some other communication devices. Communication interface 660 may be configured to communicate over metallic, wireless, or optical links. Communication interface 660 may be configured to use Time Division Multiplex (TDM), Internet Protocol (IP), Ethernet, optical networking, wireless protocols, communication signaling, or some other communication format—including combinations thereof. Communication interface 660 may be configured to communicate with other computing systems (both physical and/or virtual) and a coordination service to obtain a configuration for computing system 600.

Processing system 650 comprises microprocessor and other circuitry that retrieves and executes operating software from storage system 645. Storage system 645 may include volatile and nonvolatile, removable, and non-removable media implemented in any method or technology for storage of information, such as computer readable instructions, data structures, program modules, or other data. Storage system 645 may be implemented as a single storage device but may also be implemented across multiple storage devices or sub-systems. Storage system 645 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing system 650 is typically mounted on a circuit board that may also hold the storage system. The operating software of storage system 645 comprises computer programs, firmware, or some other form of machine-readable program instructions. The operating software of storage system 645 comprises coordination communication service 630 and packet processing service 632. The operating software on storage system 645 may further include an operating system, utilities, drivers, network interfaces, applications, or some other type of software. When read and executed by processing system 650, the operating software on storage system 645 directs computing system 600 to operate as described herein.

In at least one implementation, coordination communication service 630 directs processing system 650 to communicate with a coordination service for a private network. The coordination service can be used to maintain and distribute communication configuration information that permits computing elements to communicate in the private network. The configuration information can include private networking information (private IP addresses, ports, and the like) for the computing elements, encryption key information (public encryption keys for the computing elements), public addressing information, or some other communication information. The configuration information can permit computing elements in the private network (or gateways supporting the private network) to encapsulate, decapsulate, and forward packets to other permitted devices in the network.

Packet processing service 632 directs processing system 650 to receive a first packet that encapsulates a second packet, wherein the second packet includes an IPv6 address. The IPv6 address can include a unique identifier for gateway computing system 600 relative to one or more other gateways supporting the private network, can include an IPv4 address for the computing element behind gateway computing system 600, can include a flag indicating that packet translation is required, or can include some other information to support the processing of the second packet. When the first packet is received, packet processing service 632 directs processing system 650 to decapsulate the packet, wherein decapsulation may comprise applying a private encryption key to the second packet. Once decapsulated, packet processing service 632 can determine whether translation is required on the IPv6 address. In some examples, gateway computing system 600 can translate all incoming communications. In other examples, gateway computing system 600 can determine whether a flag is set in the IPv6 address to indicate a translation requirement. Once packet processing service 632 determines that translation is required, packet processing service 632 directs processing system 650 to identify the IPv4 address associated with the IPv6 address and replace the IPv6 address with the IPv4 address. The second packet is forwarded to a destination computing element, such as a virtual machine, with the IPv4 address in place of the IPv6 address. In some examples, the IPv6 address can include the IPv4 address for the destination.

In some implementations, in translating the IPv6 address to the IPv4 address, packet processing service 632 directs processing system 650 to translate the IPv6 header of the communication to an IPv4 header. The IPv4 header will include at least the identified destination IPv4 address and can further include a source IPv4 address.

Figure 7:
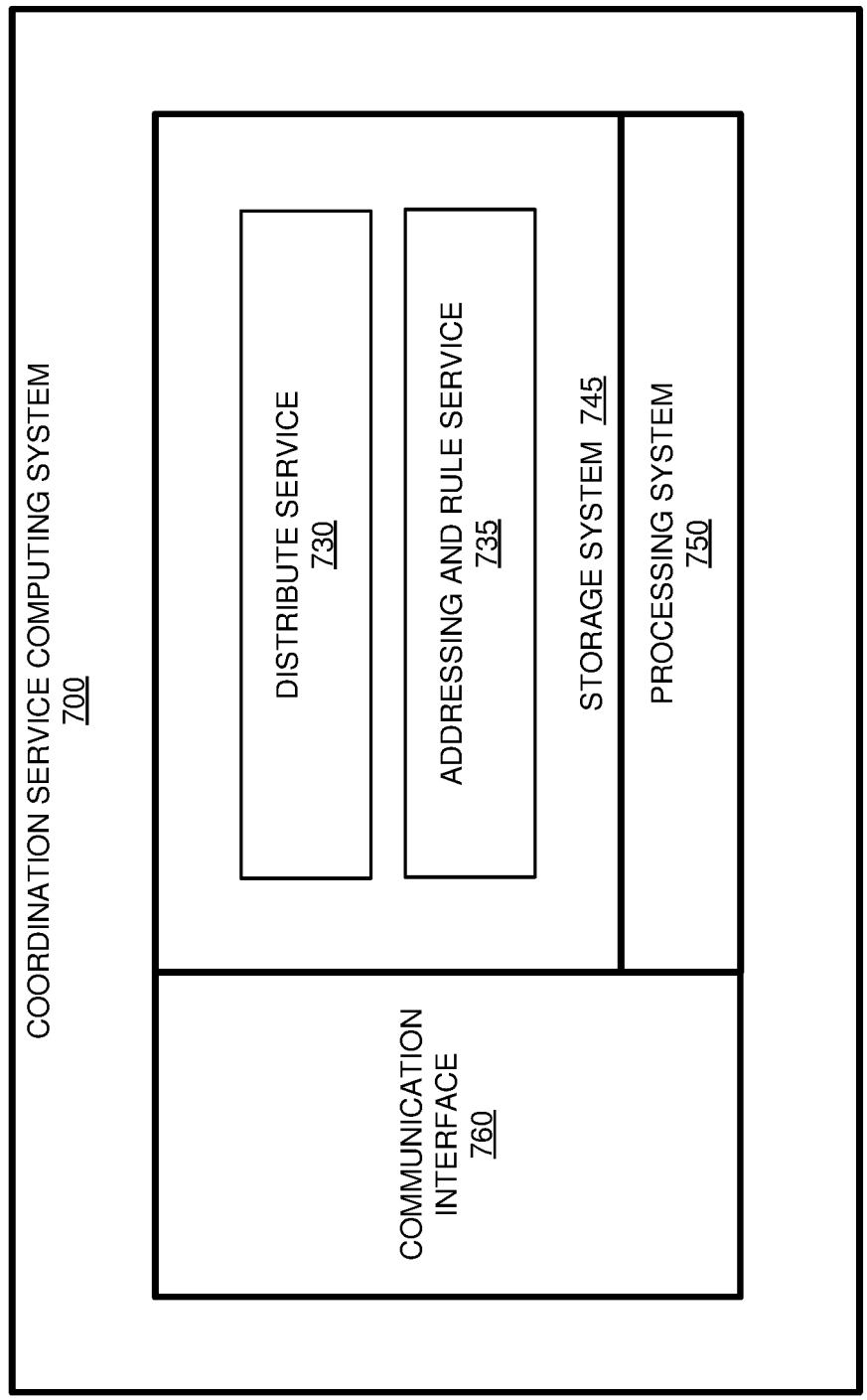
FIG. 7 illustrates a coordination service computing system to manage and distribute configuration information associated with a private network according to an implementation.

FIG. 7 illustrates a coordination service computing system 700 to manage and distribute configuration information associated with a private network according to an implementation. Computing system 700 is representative of any computing system or systems with which the various operational architectures, processes, scenarios, and sequences disclosed herein for a coordination service can be implemented. Computing system 700 is an example of coordination service 120 of FIG. 1, although other examples may exist. Computing system 700 includes storage system 745, processing system 750, and communication interface 760. Processing system 750 is operatively linked to communication interface 760 and storage system 745. Communication interface 760 may be communicatively linked to storage system 745 in some implementations. Computing system 700 may further include other components such as a battery and enclosure that are not shown for clarity.

Communication interface 760 comprises components that communicate over communication links, such as network cards, ports, radio frequency (RF), processing circuitry and software, or some other communication devices. Communication interface 760 may be configured to communicate over metallic, wireless, or optical links. Communication interface 760 may be configured to use Time Division Multiplex (TDM), Internet Protocol (IP), Ethernet, optical networking, wireless protocols, communication signaling, or some other communication format—including combinations thereof. Communication interface 760 is configured to communicate with physical and/or virtual computing elements in one or more private networks. The computing elements include gateways that can be used as an intermediary or relay for computing elements incapable of direct communication with other computing elements in the private network.

Processing system 750 comprises microprocessor and other circuitry that retrieves and executes operating software from storage system 745. Storage system 745 may include volatile and nonvolatile, removable, and non-removable media implemented in any method or technology for storage of information, such as computer readable instructions, data structures, program modules, or other data. Storage system 745 may be implemented as a single storage device but may also be implemented across multiple storage devices or sub-systems. Storage system 745 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing system 750 is typically mounted on a circuit board that may also hold the storage system. The operating software of storage system 745 comprises computer programs, firmware, or some other form of machine-readable program instructions. The operating software of storage system 745 comprises coordination service 730 and relay service 735. The operating software on storage system 745 may further include an operating system, utilities, drivers, network interfaces, applications, or some other type of software. When read and executed by processing system 750, the operating software on storage system 745 directs computing system 700 to operate as described herein.

In at least one implementation, addressing and rule service 735 can maintain communication configuration information for a private network. The communication configuration information can include private addressing information associated with computing elements of the private network, public addressing information associated with computing elements of the private network, encryption keys, communication rules indicating permitted communications between the computing elements, or some other information. In some implementations, when a computing element is added to the network, the computing element can provide public addressing information, public encryption information, or some other information to the coordination service. The coordination service can associate a private IP address to each of the computing elements, wherein the private IP address uniquely identifies each of the computing elements.

In some implementations, a private network can employ gateways for VPCs or other datacenters, wherein the computing elements behind the gateway can use a subnet of IPv4 addresses. When multiple gateways use overlapping subnets, each of the gateways can be assigned a unique identifier that can separate packets directed at a first gateway from packets identified in a second gateway. Specifically, if a computing element, such as an administrator computer, initiated a request to communicate with a virtual machine executing behind a first gateway, the IPv6 private address for the communication will include the IPv4 address associated with the virtual machine, the unique identifier for the gateway, or some other information that directs the packet to the desired destination. When the packet is identified by the administrator computer, the packet can be encapsulated using a public key associated with the destination gateway and a public IP address can be included in the encapsulation header to forward the packet to the destination gateway. In this example, the computing element can use the gateway identifier to select the encryption key and destination address used for communicating the packet across the network.

Distribute service 730 directs processing system 700 to distribute configuration information to individual computing elements and gateways that provide the private network. When a new computing element joins the network, information about the new computing element can be distributed to other computing elements and gateways in the network. Additionally, communication information can be distributed to the newly joining computing element about the other computing elements previously existing in the private network. As an example, when a gateway is added that provides connectivity to a set of computing elements in an IPv4 subnet, coordination service may identify a unique identifier for the gateway. The unique identifier can be used to direct packets to the computing elements using the gateway. Information about the unique identifier, the subnet, encryption parameters, and the like can be distributed by distribute service 730 to other computing elements in the computing environment. Once distributed, a first computing element can direct a packet to a second computing element (e.g., virtual machine) behind the new gateway using an IPv6 address that incorporates at least the IPv4 address for the second computing element and the unique identifier for the gateway. The first computing element can also encapsulate the packet using the encryption parameters provided by the coordination service and the public addressing associated with the first computing element and the gateway. In at least one example, the computing elements and gateways can maintain one or more data structures to direct and encapsulate communications in the private network. In a VPC, the gateway can provide the encapsulation and forwarding operations for the virtual machines or containers supported by the gateway.

The included descriptions and figures depict specific implementations to teach those skilled in the art how to make and use the best mode. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a gateway, the method comprising:
   receiving, from a sending computing element, a first packet that encapsulates a second packet, the second packet comprising an IPv6 destination address, wherein a first component of the IPv6 destination address comprises an IPv4 destination address and a second component of the IPv6 destination address comprises an identifier that identifies the gateway, wherein the first packet is directed to a public Internet Protocol (IP) address of the gateway, wherein the sending computing element determined the public IP address corresponds to the identifier, wherein the identifier is unique relative to one or more other identifiers of one or more other gateways, and wherein the one or more other identifiers correspond to respective public IP addresses of the one or more other gateways;

decapsulating the first packet to obtain the second packet;

translating the IPv6 destination address to the IPv4 destination address;

replacing an IPv6 header for the second packet with an IPv4 header, wherein the IPv4 header comprises at least the IPv4 destination address; and communicating the second packet with the IPv4 header to a destination computing element.

2. The method of claim 1 further comprising:

processing the IPv6 destination address of the second packet to determine whether address translation is required; and wherein translating the IPv6 destination address to the IPv4 destination address and replacing the IPv6 header for the second packet with the IPv4 header occurs in response to a determination that address translation is required.

3. The method of claim 1, wherein the destination computing element comprises a virtual machine or container.

4. The method of claim 1, wherein the destination computing element comprises a physical computer.

5. The method of claim 1, wherein the IPv6 destination address further comprises a flag indicative that IPv6 to IPv4 translation is required.

6. The method of claim 1, wherein the first packet comprises a destination IP address in an encapsulation header that corresponds to the gateway.

7. A computing apparatus comprising:

a storage system;

a processing system operatively coupled to the storage system; and program instructions stored on the storage system to implement a gateway that, when executed by the processing system, direct the computing apparatus to:

receive, from a sending computing element, a first packet that encapsulates a second packet, the second packet comprising an IPv6 destination address, wherein a first component of the IPv6 destination address comprises an IPv4 destination address and a second component of the IPv6 destination address comprises an identifier that identifies the gateway, wherein the first packet is directed to a public Internet Protocol (IP) address of the gateway, wherein the sending computing element determined the public IP address corresponds to the identifier, wherein the identifier is unique relative to one or more other identifiers of one or more other gateways, and wherein the one or more other identifiers correspond to respective public IP addresses of the one or more other gateways;

decapsulate the first packet to obtain the second packet;

translate the IPv6 destination address to the IPv4 destination address;

replace an IPv6 header for the second packet with an IPv4 header, wherein the IPv4 header comprises at least the IPv4 destination address; and communicate the second packet with the IPv4 header to a destination computing element.

8. The computing apparatus of claim 7, wherein the program instructions further direct the computing apparatus to:

process the IPv6 destination address of the second packet to determine whether address translation is required; and wherein translating the IPv6 destination address to the IPv4 destination address and replacing the IPv6 header for the second packet with the IPv4 header occurs in response to a determination that address translation is required.

9. The computing apparatus of claim 7, wherein the destination computing element comprises a virtual machine or container.

10. The computing apparatus of claim 7, wherein the destination computing element comprises a physical computer.

11. The computing apparatus of claim 7, wherein the IPv6 destination address further comprises a flag indicative that IPv6 to IPv4 translation is required.

12. The computing apparatus of claim 7, wherein the first packet comprises a destination IP address in an encapsulation header that corresponds to the gateway.

13. An apparatus comprising:

a storage system; and program instructions stored on the storage system to act as a gateway that, when executed by a processing system of a computer, direct the computer to:

receive, from a sending computing element, a first packet that encapsulates a second packet, the second packet comprising an IPv6 destination address, wherein a first component of the IPv6 destination address comprises an IPv4 destination address and a second component of the IPv6 destination address comprises an identifier that identifies the gateway, wherein the first packet is directed to a public Internet Protocol (IP) address of the gateway, wherein the sending computing element determined the public IP address corresponds to the identifier, wherein the identifier is unique relative to one or more other identifiers of one or more other gateways, and wherein the one or more other identifiers correspond to respective public IP addresses of the one or more other gateways;

decapsulate the first packet to obtain the second packet;

process the IPv6 destination address of the second packet to determine whether address translation is required;

in response to determining that address translation is required, translate the IPv6 destination address to the IPv4 destination address;

replace an IPv6 header for the second packet with an IPv4 header, wherein the IPv4 header comprises at least the IPv4 destination address; and communicate the second packet with the IPv4 header to a destination computing element.

14. The apparatus of claim 13, wherein the destination computing element comprises a virtual machine or container.

15. The apparatus of claim 13, wherein the destination computing element comprises a physical computer.

16. The apparatus of claim 13, wherein a coordination service of a private communication network connecting the sending computing element and the destination computing element assigns the identifier to the gateway and the one or more other identifiers to the one or more other gateways.

17. The apparatus of claim 13, wherein the first packet comprises a destination IP address in an encapsulation header that corresponds to the gateway.

18. The apparatus of claim 13, wherein the program instructions further direct the computer to:

request a communication configuration from a coordination service;

receive the communication configuration from the coordination service; and wherein decapsulating the first packet to obtain the second packet comprises decapsulating the first packet to obtain the second packet using the communication configuration, wherein the communication configuration comprises at least an encryption key.

* * * * *